May 24, 1938.  C. O. BERGSTROM  2,118,757
ELECTRIC MOTOR
Original Filed Nov. 27, 1934
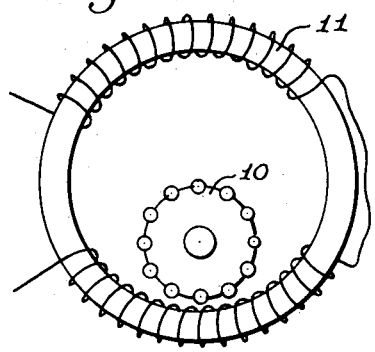
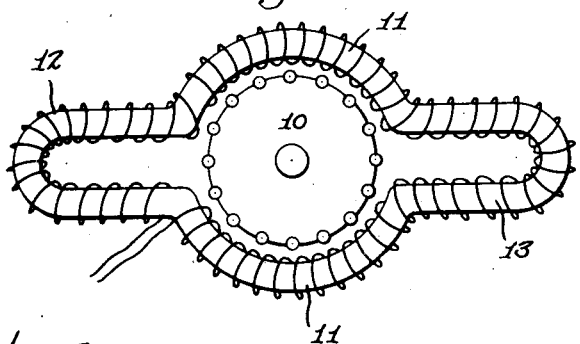
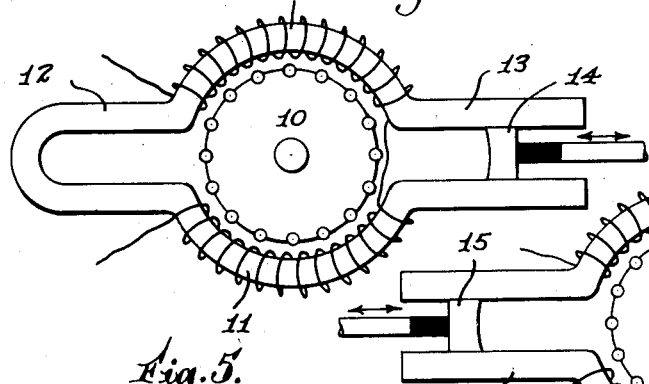
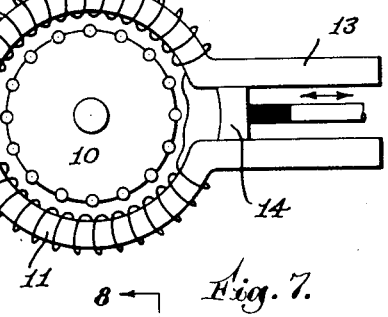
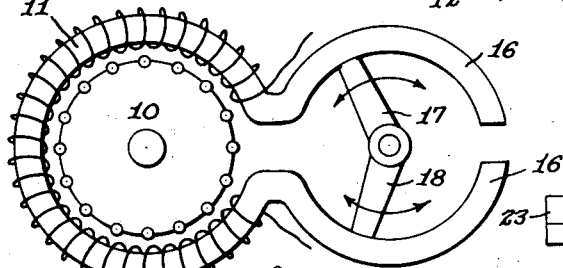
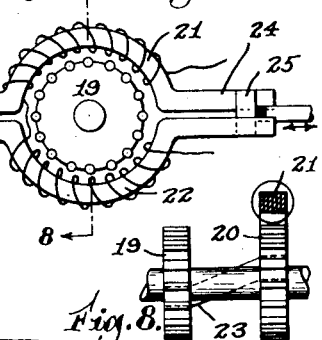
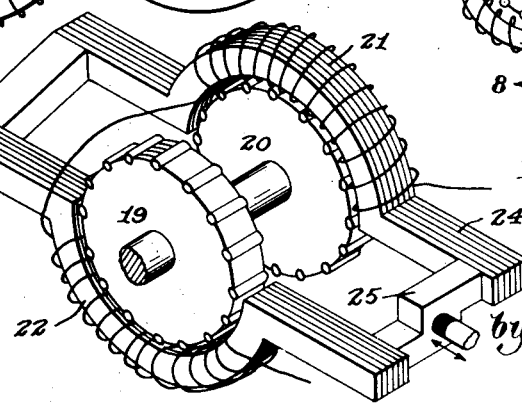
Inventor
CARL O. BERGSTROM
by Robert T. Palmer
Attorney Patented May 24, 1938

2,118,757

UNITED STATES PATENT OFFICE 2,118,757

ELECTRIC MOTOR

Carl O. Bergstrom, Boston, Mass., assignor to B. F. Sturtevant Company, Hyde Park, Boston, Mass.

Application November 27, 1934, Serial No. 754,991
Renewed January 5, 1937

4 Claims. (Cl. 172—275)

This invention relates to alternating current motors of the type having a revolving, magnetic field.

In the ordinary induction motor, a rotating, magnetic field is set up, which revolves at synchronous speeds, the revolutions per minute of which are equal to frequency times sixty, divided by the number of pairs of poles. The armature or rotor has short circuited, secondary windings, across the conductors of which the revolving, magnetic field passes and induces in these secondary conductors, currents which, according to the Lenz's law, are in such direction as to oppose the cause. That is to say, these secondary currents react on the revolving, magnetic flux in such a way as to draw the secondary conductors and associated rotor structure along with the rotating flux. The armature or rotor of the ordinary induction motor can never obtain full synchronous speed, there always being a slip, causing the maximum armature speed to be a considerable number of revolutions per minute lower than the synchronous speed of the field.

According to a feature of this invention, a motor is provided, the armature of which revolves at speeds greater than the synchronous speed of its revolving field. This is accomplished by providing a field or stator structure in which the length of travel of the rotating flux is substantially greater than the circumference of the armature, with the result that, while its revolutions per minute are unchanged over that in the ordinary stator, its speed at any point, in feet per second, is considerably increased with corresponding increase in the number of rotor conductors cut per unit of time by the flux, and corresponding increase of revolutions per minute of the rotor. Thus, the speed of the rotor, neglecting for the moment the usual slip, is increased an amount proportional to the length of travel of the magnetic flux in one complete circuit of the field, divided by the circumference of the rotor.

According to another feature of this invention, the speed of the rotor may be easily varied from speed substantially equal to the synchronous speed of the field to a predetermined maximum. This is accomplished by· varying the length of travel of the revolving, magnetic flux.

An object of the invention is to increase the speed of the rotor of a motor having a revolving field above that of the synchronous speed of the field.

Another object of the invention is to vary the speed of the rotor of a motor having a revolving field, by varying the length of travel of the field flux.

The invention will now be described with reference to the drawing, of which:

Fig. 1 is a diagrammatic view of one embodiment of the invention in which a rotor of an induction motor is mounted off-center in a relatively large stator;

Fig. 2 is a diagrammatic view of another embodiment of the invention in which the stator has but slightly greater diameter than the rotor, except for extensions at the two sides thereof;

Fig. 3 is a diagrammatic view similar to Fig. 2, except that one of the stator extensions is provided with a movable, magnetic shunt for varying the length of travel of the magnetic flux;

Fig. 4 is a diagrammatic view similar to Fig. 3, except that both stator extensions are provided with movable, magnetic shunts;

Fig. 5 is a diagrammatic view of another embodiment of the invention, the stator being divided into two portions, one of which follows closely the outline of the rotor except for a small gap at one side, the other portion being circular in form and having a revolvable, magnetic shunt;

Fig. 6 is a projected, diagrammatic view of another embodiment of the invention, which is similar to that illustrated by Fig. 3, except that the rotor is divided into two spaced portions and the stator is divided into two cooperating spaced portions to prevent the leakage of flux across the gaps between the extensions of the stator;

Fig. 7 is a side view of Fig. 6, on reduced scale, and

Fig. 8 is a sectional view along the lines 8—8 of Fig. 7.

In the ordinary induction motor, the rotor is dragged, so to speak, around by the rotating magnetic flux in the stator. Ordinarily, the stator structure, in efficiency's interest, follows closely the outline of the rotor, the two being separated by a very small air gap. Since the rotating, magnetic flux in the stator drags at the surface of the rotor, the rotation of the latter is caused by a surface effect. So, when the rotor 10 is displaced off-center in a relatively large stator 11, as illustrated by Fig. 1, the magnetic flux passes each of the conductors of the rotor at a considerably higher surface speed than if the rotor was centered in the stator. The larger the stator for a given size rotor in an off-center arrangement, as shown by Fig. 1, the greater the speed of revolution of the rotor, this because, although the synchronous speed in revolutions per minute may remain the same, the linear or surface speed increases as the length of travel of the magnetic flux increases. Thus, the speed of rotation of an induction motor may be increased above the synchronous speed of the field by increasing the length of travel of the field magnetic flux. In the arrangements illustrated, the entire stator 11 may be wound in the usual fashion, or only that portion adjacent and opposite the rotor, as indicated by Fig. 1, may be wound.

Realizing that, while with the arrangement illustrated by Fig. 1, increased speeds may be attained by undesired loss of efficiency, the arrangements of Figs. 2 to 8 inclusive provide a more efficient magnetic structure.

With reference to Figs. 2 to 4 inclusive, the rotor 10 is provided with a stator 11 which follows closely the outline of the rotor, except for the two extensions 12 and 13. Thus, the air gap between the rotor and stator may be that in usual practice, except for the two extensions at each side of the stator. These extensions give an increased travel for the magnetic flux of the field, with the result that with each revolution of the field flux, it cuts a larger number of conductors of a rotor per unit of time than it would were the extensions not provided, with the result that the rotor revolves at speeds above the synchronous speed of the field, this increased speed being substantially equal to the synchronous field speed multiplied by the length of travel of the field flux, divided by the circumference of the rotor.

In the arrangement shown by Fig. 3, the extension 13, instead of being closed, has a movable, magnetic shunt 14, which may be moved towards or away from the rotor to vary the length of travel of the flux of the magnetic field. The magnetic flux in each case passes across the magnetic shunt 14. Thus, the position of the shunt 14 determines the length of travel of the flux.

Fig. 4 illustrates an arrangement similar to Fig. 3, except that the stator extension 12 has a magnetic shunt 15 similar to that of the magnetic shunt 14 of the stator extension 13. When the two shunts 14 and 15 are moved to their innermost position nearest the rotor, the rotor will obviously revolve at the synchronous speed of the field minus the usual slip. When either or both of the magnetic shunts are moved away from the rotor, the speed of the latter increases proportional to the increase in the length of travel of the magnetic flux caused by the positions of the magnetic shunts.

Fig. 5 illustrates another arrangement for obtaining longer field flux travel. In this arrangement, the stator 11 is provided with a circular extension 16, on which are rotatably mounted the two magnetic shunts 17 and 18, which may be moved together towards the rotor 10 to shorten the length of travel of the magnetic field flux, or oppositely to increase the length of travel of the revolving field flux. Thus, the speed of rotation of the rotor 10 may be increased or decreased by varying the position of the magnetic shunt formed by the members 17 and 18.

Since under some conditions, dependent upon the nature of duty, magnetic metals employed, etc., there might be appreciable leakage across the gaps adjacent the rotor, between the upper and lower members of the extension 12 or extension 13, the embodiment of the invention illustrated by Figs. 6, 7 and 8 is provided with two rotors 19 and 20, the stator being formed in two off-set portions, 21 cooperating with rotor 20, and 22 cooperating with rotor 10. The stator is provided with the two extensions 23 and 24 corresponding to the extensions 12 and 13 of Figs. 2, 3 and 4, but the distance between the lower legs of these extensions is so great that no appreciable amount of magnetic flux may leak across the gap, substantially all of the working flux taking the path defined by the magnetic material forming the stator, its extensions, and its magnetic shunt 25. The magnetic shunt 25 may be moved in and out towards the rotors to decrease their speed of rotation, or away from the rotors to increase their field of rotation.

The leakage across the gaps referred to in the preceding paragraph may also be reduced or prevented by providing the rotor with deeper slots than are usually employed. This will increase the core density, providing a higher leakage reactance, with the result that the magnetic flux will take the path of lower reactance through the stator structure.

It has been determined that, according to this invention, high speed induction motors may be provided. The limiting factor in rotor speed heretofore has been the number of field poles and frequency available. High speed induction motors have, therefore, not been available. This invention, therefore, provides an induction motor, the speed of which may be increased far above that now ordinarily obtained. Such high speeds are desirable even though obtained with slight loss of efficiency.

While the invention has been illustrated as applied to an induction motor with single phase windings and squirrel cage rotor, it should be understood that the invention should not be so limited, but may include multi-phase motors of any type which employ rotating magnetic fields, and rotating field motors with squirrel cage type or wound rotors.

Whereas several embodiments of the invention have been described for the purpose of illustration, it should be understood that the invention is not limited to the details described, since many modifications may be made by those skilled in the art without departing from the spirit of the invention.

What is claimed is:

1. An induction motor of the type having a revolving magnetic field flux comprising a magnetic rotor, a stator around said rotor having a plurality of portions through which the revolving field flux travels around said rotor, one of said portions of said stator being closely spaced from the surface of said rotor and another portion of said stator being spaced a substantial distance from said rotor, and field windings each having a plurality of turns, on said stator on opposite sides of said rotor for producing the magnetic field.

2. An induction motor of the type having a revolving magnetic field flux comprising a magnetic rotor, and a stator around said rotor having a plurality of portions through which the rotating magnetic flux around said rotor travels, one of said portions being so closely spaced from the surface of said rotor as to provide a small air gap between said stator and rotor and another of said portions being so spaced from the surface of said rotor as to provide a substantial air gap between a substantial surface of said stator and said rotor whereby the length of travel of the revolving field flux in said stator is substantially greater than the circumference of said rotor.

3. An induction motor of the type having a revolving magnetic field flux comprising a magnetic rotor, and a stator around said rotor having a plurality of portions through which the rotating magnetic flux around said rotor travels, one of said portions being so closely spaced from the surface of said rotor so as to provide a small air gap between said stator and rotor and another of said portions being so spaced from said rotor as to provide so substantial an air gap between a substantial surface of said stator and said rotor that the revolving field flux can have substantially no rotative effect upon the surface of the rotor adjacent same.

4. An induction motor of the type having a revolving magnetic field flux comprising a magnetic rotor, a stator around said rotor having a plurality of portions through which the rotating magnetic flux around said rotor travels, one of said portions being so closely spaced from the surface of said rotor as to provide a small air gap between said stator and rotor and another of said portions being so spaced from the surface of said rotor as to provide a substantial air gap between a substantial surface of said stator and said rotor whereby the length of travel of the revolving field flux in said stator is substantially greater than the circumference of said rotor, and field windings each having a plurality of turns, on said stator on opposite sides of said rotor for producing the magnetic field.

CARL O. BERGSTROM.